United States Patent

Waldeck

[11] 3,936,609
[45] Feb. 3, 1976

[54] SUBMULTIPLEX TRANSMISSION OF ALARM STATUS SIGNALS FOR A TIME DIVISION MULTIPLEX SYSTEM

[75] Inventor: Gary C. Waldeck, Foster City, Calif.

[73] Assignee: GTE Automatic Electric Laboratories Incorporated, Northlake, Ill.

[22] Filed: Feb. 14, 1974

[21] Appl. No.: 442,522

[52] U.S. Cl. .......................... 179/15 BF; 179/15 BS
[51] Int. Cl.² ............................................ H04J 3/14
[58] Field of Search........ 179/15 BF, 15 BY, 15 BS; 178/69.5 R

[56] References Cited
UNITED STATES PATENTS 3,542,957   11/1970   Mitchell .......................... 179/15 BY
3,689,699   9/1972   Brenig............................ 179/15 BS Primary Examiner—Thomas A. Robinson
Attorney, Agent, or Firm—Leonard R. Cool; Russell A. Cannon; David W. Heid

[57] ABSTRACT

A time division multiplex system includes a status channel as well as a plurality of information channels and a frame synchronization channel in each frame. A submultiplexer combines a "winking" framing pulse with four different status signals to derive a four-state code. One state of the code contains a "winking" submultiplexer framing signal, and the other states transmit status information to control system alarm and restoral conditions.

5 Claims, 5 Drawing Figures

3,936,609

SUBMULTIPLEX TRANSMISSION OF ALARM STATUS SIGNALS FOR A TIME DIVISION MULTIPLEX SYSTEM

BACKGROUND OF THE INVENTION

1. Field of the Invention

This invention relates to alarm and control techniques for multiplex systems and in particular for systems which use time division multiplexing for the transmission of signaling information.

2. Description of the Prior Art

Alarm and control systems for frequency division multiplex (FDM) and pulse code modulation (PCM) carrier system are well known in the art. An example of an alarm and test technique for FDM system is disclosed in U.S. Pat. 2,986,610. In this arrangement, the signal transmission via the transmission path is monitored by use of a 96 kHz pilot tone which is transmitted along with the double sideband FDM channel signals. At the receiving terminal the 96 kHz tone is rectified and the amplitude of the rectified voltage is compared with a reference. A transmission failure is identified when the rectified voltage is above or below predetermined maximum or minimum values. Action is then taken to notify the terminal at the other end and to subsequently drop off and then busy out the trunks to prevent a subscriber from being hung up on an inoperative channel. At a fixed time interval following the busy out, the transmission path is tested to determine if the transmission anomaly has self-cleared. If it has, the restoral process is initiated. If not, the terminals lock out in alarm condition.

A similar alarm system is disclosed in U.S. Pat. 3,112,370. In this arrangement, the system employs PCM and use is made of the least significant message digit space of the channel code and the digit space, per channel, which has been added for signaling purposes, to transmit the alarm information between terminals. This is done by forcing a specific binary condition in the least significant message digit, a condition that would be abnormal to the condition that would occur during normal operation. In contrast to the FDM technique, which relies upon the deviation of the rectified amplitude from a predetermined range, a transmission anomaly is recognized, in the PCM system, by an out-of-frame condition, which cannot be corrected within a predetermined time.

SUMMARY OF THE INVENTION

In a time division multiplex system having a recurrent framing sequence, a "winking" frame synchronization signal and successive signals in a separate status channel are combined to provide a plurality of terminal status signals.

DESCRIPTION OF THE PREFERRED EMBODIMENT

Figure 1:
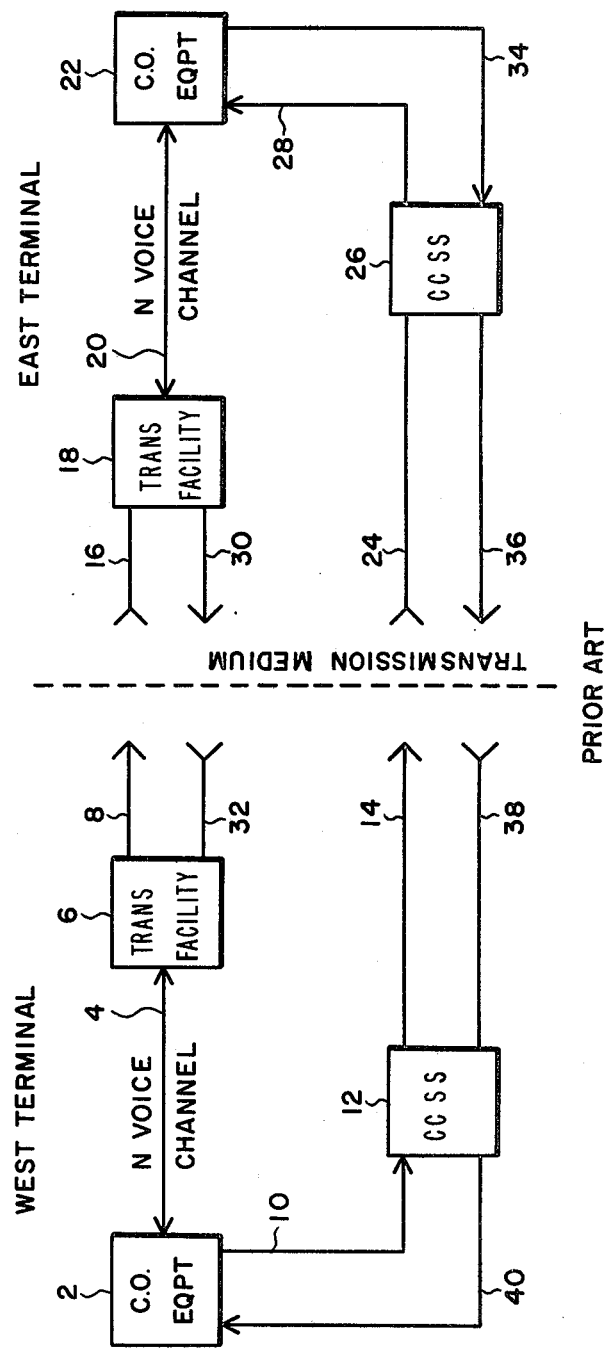
FIG. 1 is a simplified block diagram of a prior-art arrangement which shows a central office terminal, a separate path for voice transmission, and a common channel signaling system.

Referring to FIG. 1, the central offices 2 and 22 contain the basic switching, trunk circuit, and signaling equipment. Where common channel signaling is to be used, different transmission facilities are used for the $n$ voice channels than are used for the associated n signaling channels. Thus, at the West Terminal, the $n$ voice signals are transmitted over path 4 to transmission facility 6, which could either be a carrier current system operating over cable, open wire or radio, or a multiplicity of cable or open-wire pairs. The associated signaling information is applied via path 10 to the transmitting portion of common channel signaling system (CCSS) 12. Either TDM or FDM can be employed to subdivide a voice channel into a plurality of signaling channels. Both techniques have been employed in prior-art systems. Where carrier current systems are employed for voice transmission, a four-wire channel may be set aside for East-West and West-East transmission of the associated signaling information. Alternatively, a completely separate transmission facility may be used so the transmit signaling path 14 and receive path 38 are not shown interconnected with transmission facility 6. A similar arrangement of voice and signaling circuits is shown for the East terminal. Operation and interconnection of such arrangements are well known in the art and will not be discussed further.

Figure 2:
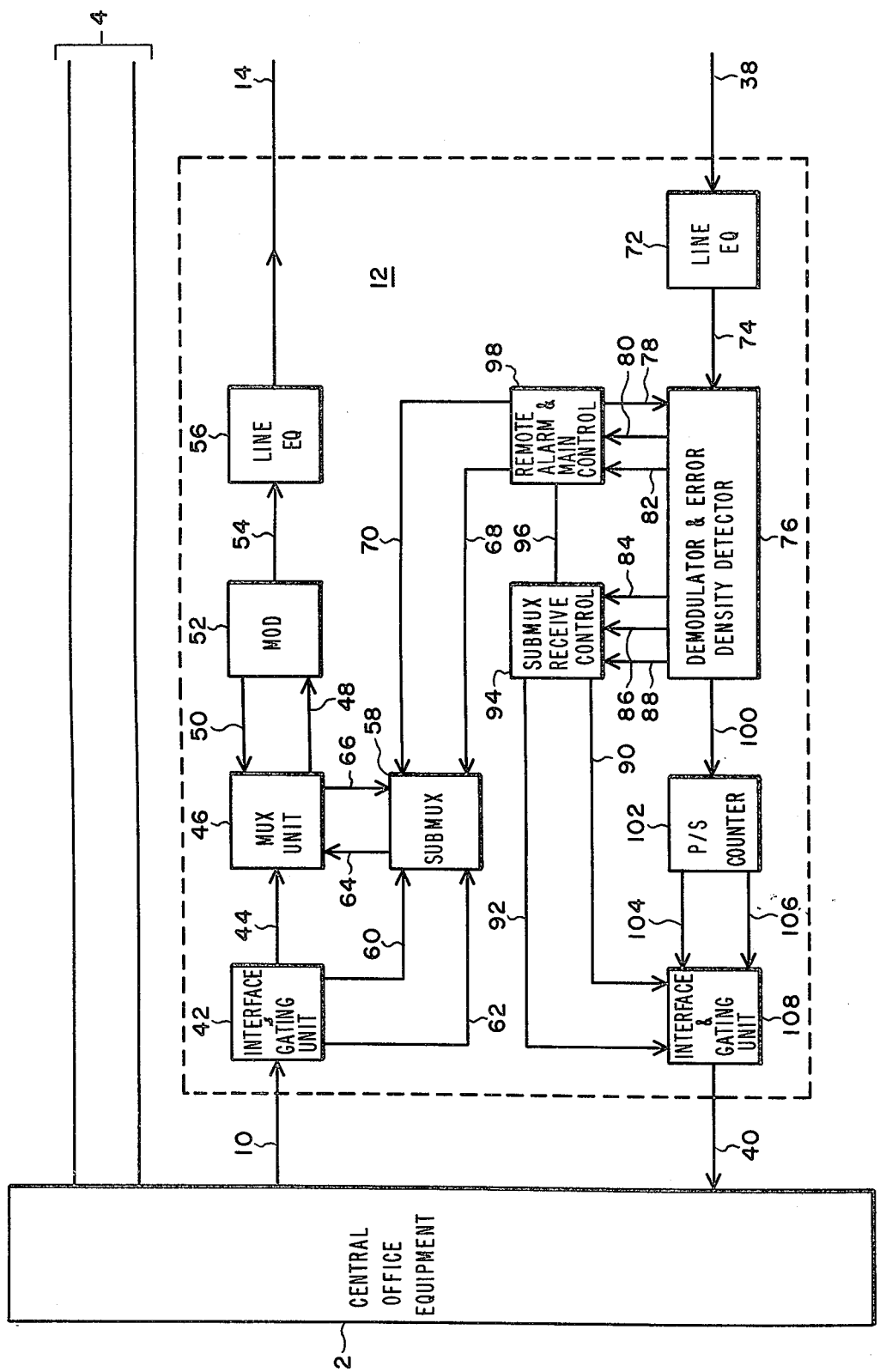
FIG. 2 is a simplified block diagram of a preferred embodiment of the invention operating in combination with a common channel signaling system which uses time division multiplex.

In FIG. 2 a preferred embodiment of the invention is illustrated in conjunction with a CCSS terminal employing TDM. Only one terminal (West) is shown since the (East) terminal would be similar. Where possible, the same identifying numbers are used for those units which perform a similar function as were used in FIG. 1. Note that 12 is indicative of a CCSS terminal, and this is the equipment included in the dotted box. However, it should be understood that the alarm system, which is also enclosed and which is intimately related to the transmitting and receiving systems of the CCSS terminal 12, is, of course, not considered to be old. Further, as will be shown later, certain features of the transmitting and receiving sections provide novel elements of the invention.

From central office equipment 2, path 10 provides a number of parallel signaling input connections to the transmitting interface and gating unit 42. As is well known, the binary signaling output conditions which are often available are open or ground or battery or ground. When used, the battery voltage may be −48 volts. The interface equipment translates those different binary conditions into a standard binary format and at the same time converts the translated binary signal conditions into voltage values which are readily usable for integrated circuits. In the instant case, a break-normal on-hook condition—is binary 1 and this is a 0 volt level. A make-normal off-hook condition — is binary 0 and this is a −5 volt level.

The gating circuit ensures that each pulse has a minimum duration before it is transmitted on to the transmit time division multiplex unit 46. While any number of signaling channels could be processed by the multiplex unit 46, we will fix the number of signaling channels at 24 made up from two 12-channel groups. In addition, a system framing channel and a status channel are included in each TDM frame so each frame contains 26 time-divided spaces, or TDM channels. The timing for these channels is derived from a novel counter arrangement in which a five-bit counter is only permitted to count to 25 before it is reset. A 2400 kHz clock pulse signal is supplied to the input of the counter via path 50 from modulator 52. The clock rate is more than sufficient since the signaling information applied to TDM 46 has a pulse rate in the order of 10 pps. Thus, recovery of the information applied is assured based upon the well-known sampling theorem. A flip-flop is connected to the output of the counter and is toggled each frame, which thus generates a "winking" system framing pulse. Such "winking" framing pulses are well known in the art. Reference may be made, for example, to U.S. Pat. Nos. 2,927,965 and 3,261,918. The order in which the signaling channels and the system framing and status channels are taken can be arbitrary. For purposes of discussion and not as a limitation, the first channel, i.e., 0 in the 26 channels numbered 0 – 25, contains the system framing signal and is followed, in turn, by the 24 signaling channels and finally the status channel, which is designated 25. The status signal is derived by a combination of the system framing pulse, applied to the transmit submultiplexer 58 via path 66, and the status conditions. Local terminal conditions may be applied to the submultiplexer via paths 60 and 62. These could be binary normal conditions for each 12 channel group and could permit transmission of abnormal status separately for each 12 channel group. Such an arrangement would prevent, for example, taking all 24 channels out of service if only one group had an alarm condition. Two additional status signals are applied from Remote Alarm and Main Control 98 via paths 68 and 70. Path 68 is connected to logic circuitry in the submultiplexer framing circuit. Path 70 is connected to the logic circuitry which effects simultaneous restoral to normal operation of the East and West terminals whenever normal operating conditions are indicated following an alarm condition. Thus, for a normal incoming signal, path 68 provides a binary indication which permits generation of a "winking" submultiplexer framing pulse and path 70 provides an indication to submultiplexer 58 which inhibits transmission of restoral information, i.e., it indicates that a normal condition prevails.

Thus, we have four conditions which are transmitted via the submultiplexer and one such condition is transmitted, each frame recurrently, on a four-frame sequence. In the preferred embodiment of the invention, the "winking" system framing pulse and the submultiplexer "winking" framing pulse, $D_0$, are arranged so that the submultiplexer pulse is only "1" when the system framing pulse is "0". During normal conditions, the remaining submultiplexer conditions do not change but will remain the same frame after frame. These are selected so the second pulse, the restoral pulse $D_1$, is a "1" during normal conditions and the "trunk make busy" pulses for each of the two twelve channel groups, $D_2$ and $D_3$, are both "0". During a four-frame sequence, the submultiplexer and system framing pulses will be:

TABLE I

| | Status | System Framing |
|---|---|---|
| $D_0$ | 1 | 0 |
| $D_1$ | 1 | 1 |

TABLE I-continued

| | Status | System Framing |
|---|---|---|
| $D_2$ | 0 | 0 |
| $D_3$ | 0 | 1 |

During the next four-frame sequence, only the $D_0$ pulse will change during normal operation and it will become "0". As can be seen from Table I, the system framing pulse will also be "0" in the frame, thus there is an alternating 1 0 and 0 0 condition every four frames.

The TDM output is passed via path 48 to modulator 52 where it is prepared for transmission. A number of techniques may be employed. In the preferred embodiment FSK duobinary is used. The FSK duobinary is described in U.S. Pat. No. 3,238,299. The duobinary technique is used because it permits a reduction in bandwidth for the bit rate employed and because error detection is possible without the necessity of adding redundant digits. From modulator 52 the duobinary FSK signal is passed via path 54 to line equipment 56 where level control and impedance matching circuitry provides final conditioning before the signal is transmitted over transmission path 14.

The duobinary FSK signals enter CCSS 12 from transmission path 38 via receiving line equipment 72, where it passes to the demodulator 76 via path 74. Demodulator 76 includes a receiving clock, which receives timing information from the incoming data signal; a carrier detector circuit and a data error detection circuit. This latter includes a unique error density circuit which precludes an alarm condition from being effected because of random error occurrences. This circuit will be described in detail below.

The data output is passed from demodulator 76 over path 100 to TDM parallel-to-serial counter 102, and then to the receiving gates and interface units 108. Timing information for the gates is supplied over path 106. The received signaling pulses undergo pulse correction in 108 before being transmitted over the respective paths 40 to the central office 2.

Returning now to demodulator 76, it is seen that a frame check signal is applied to remote alarm and main control 98 via path 80; and a pulse density signal is applied via path 82. An alarm hold signal is passed in the reverse direction, i.e., from 98 to 76 via path 78. Further, the system frame and submultiplexer frame information is appled to the S-M receiver control 94 via paths 86 and 84, respectively. In addition, a receiver control reset pulse is applied to 94 via path 88.

Channel Counter

Figure 3:
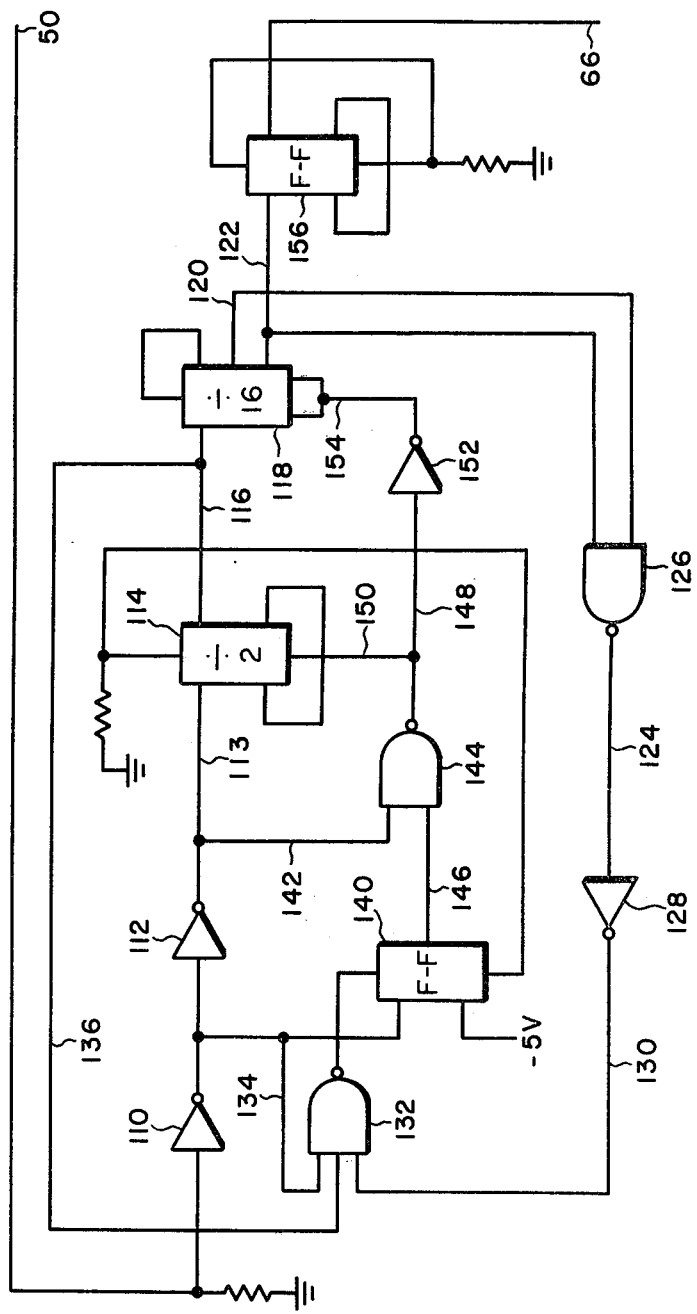
FIG. 3 is a detailed block diagram of a 26-state channel counter.

As was noted hereinabove, a 26-state binary counter is used in a preferred embodiment to provide the time division channels for 24 signaling channels, a system framing pulse and a status pulse for each frame. The novel manner in which this is accomplished is shown in FIG. 3. A 2400 Hz clock is applied to the counter via path 50 to inverters 110 and 112 to divide by two flip-flop 114. The output of F/F 114 is routed to the input of divide-by-16 circuit 118 via path 116. If nothing further is done, the counter circuit would result in a 32-state counter. However, 26 states, 0 to 25, are required. When the counter reaches a count of 25, the outputs 120 and 122 of 118 are both binary "1", and are applied to the respective inputs of NAND-gate 126. The output of 126 is thus binary "0", which is inverted in inverter 128, and a binary "1" is applied to a first input of NAND-gate 132. The output of the divide-by-two 114 is binary "1" which is applied to a second input of NAND-gate 132 via path 136. The inverted clock is applied from the output of inverter 110 to the third input of NAND gate 132 via path 134, and this input is binary "0". When the clock input on path 50 next goes to binary "0", the third input to NAND-gate 132 goes to binary "1", and the output of 132 goes to binary "0". This presets flip-flop 140 which applies a binary "1" via path 146 to one input of NAND-gate 144. Since the other input to 144 is still low, nothing happens. When the clock input next goes to binary "1" as if to increase the binary count to 26, the counter is reset because NAND-gate 144 now provides a binary "0" output via path 150 to divide-by-two counter 114. The output of gate 144 is inverted in inverter 152 to provide a binary " 1" via path 154 to reset 118. The counter outputs, not shown, are applied to the TDM circuit to derive the serial-by-bit data stream. One output of 118 is applied to flip-flop 156 via path 122. Flip-flop 156 is toggled once each frame to supply the 1 - 0 - 1 - 0 "winking" system framing pulse at its output. This is applied to the TDM circuit for insertion of the framing pulse and via path 66 to an input of the transmit submultiplexer 58.

Transmit Submultiplexer

Figure 4:
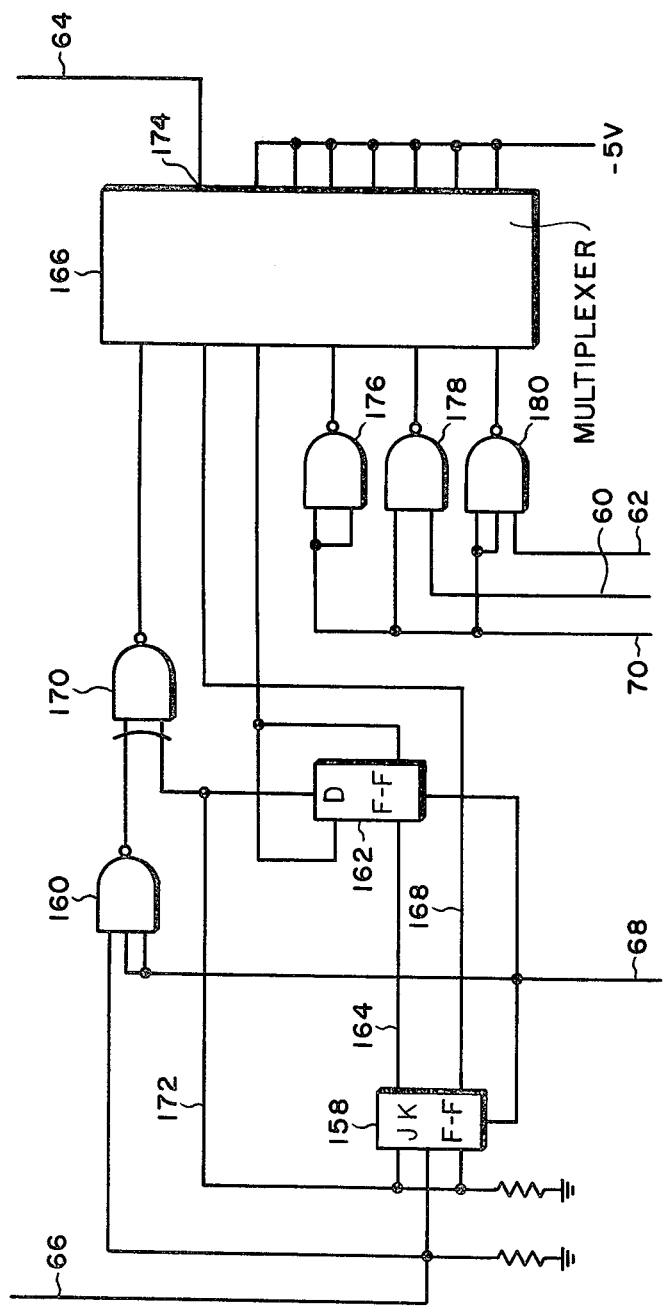
FIG. 4 is a detailed block diagram of a preferred embodiment of the transmitting section of the submultiplexer.

Referring to FIG. 4, the submultiplexer also has bit inputs $D_0$, $D_1$, $D_2$, and $D_3$ on path 68, 70, 60, and 62, respectively.

As explained hereinabove, under normal circumstances, $D_0$ is binary "1", $D_1$ is binary "1", and $D_2$ and $D_3$ are each binary "0". Further, $D_0$ is associated with the submultiplexer framing pulse, $D_1$ is associated with restoral following clearance of an alarm condition, and $D_2$ and $D_3$ are available for other alarm functions. For example, the $D_2$ and $D_3$ bit positions of the submultiplexer may be used to transmit the status condition of each 12-channel group for the 24 signaling channels employed in a preferred embodiment of the invention. Thus, only 12 signaling channels plus their associated voice frequency channels need be taken from service if an alarm condition only appears in one 12-channel group.

The system framing pulse enters the submultiplexer via path 66 and is applied to the clock input of JK flip-flop 158 and one input of NAND-gate 160. The $D_0$ input enters on path 68 where it is applied to the clear inputs of JK flip-flop 158 and D flip-flop 162 and to a combined pair of inputs of NAND-gate 160. Under normal conditions, $D_0$ = "1"; thus, the clear level is absent on flip-flops 158 and 162. The Q output of 158 is applied to the CP input of 162 via path 164. The $\overline{Q}$ output of 158 is connected to 8-bit multiplexer 166 via path 168. The JK inputs of 158 are connected to the PS input of 162 and to one input of NOR-gate 170 via path 172. The $\overline{Q}$ output of flip-flop 162 is connected to multiplexer 166. With $D_0$ a binary "1", the transmit framing pulse passes to multiplexer 166 because gate 160 is enabled. The binary code, a "winking" submultiplexer framing signal, generated by the system framing pulse and JK flip-flop 158 is used to encode the submultiplexer information in 8-bit multiplexer 166 for transmission. The submultiplexer encoded output status signal appears at multiplexer output 174, and the status signal is sent via path 64 to the transmitting TDM in 46.

The $D_1$ input via path 70 enables NAND-gates 176, 178, and 180. Gate 176 provides the $D_1$ input to multiplexer 166 and, under normal conditions, $D_1$ is a binary "1", thus providing a binary "0" input to the multiplexer. Gates 178 and 180 would have binary "1" inputs to the multiplexer. The result of the coding operation provides a winking submultiplexer framing pulse which is binary "0" during the frame in which the system framing pulse is binary "1", followed by three frames in order in which $D_1$ is binary "1", $D_2$ is binary "0", and $D_3$ is binary "0". The system framing pulse and submultiplexer pulses are encoded as hereinbefore described in Table I.

In the event of a major alarm condition, i.e., loss of power, loss of system framing or excessive error count in the data stream, the remote alarm and main control 98 will output a binary "0" over paths 68 and 70. This will inhibit the submultiplexer framing pulse and it will no longer alternate. This will be received by the other terminal and will cause an alarm because of a loss in framing synchronization. Upon restoral from an alarm condition, $D_0$ only is enabled. All other submultiplexer bits are held clear by $D_1$, which is connected to gates 176, 178, and 180. When the other terminal recognizes and accepts the submultiplexer framing signal, it will release a 15-second timer. If all is still functioning correctly at the end of this period, $D_1$ is changed from binary "0" to binary "1", thereby enabling gates 176, 178, and 180 to permit the normal transmission of submultiplexer bits.

Error Density Detection

Detection of errors in the received signaling information is one method of determining that there is an impairment in the transmission path. If a significant number of errors are detected in a specified time interval, an alarm condition should be indicated and action may be initiated to switch from one v-f transmission path to another. As was previously noted, the duobinary signal permits detection of errors without the necessity of adding redundant digits. Reference may be made to U.S. Pat. No. 3,337,864 for an understanding of the characteristics of the duobinary signal and of the manner in which errors may be detected.

Figure 5:
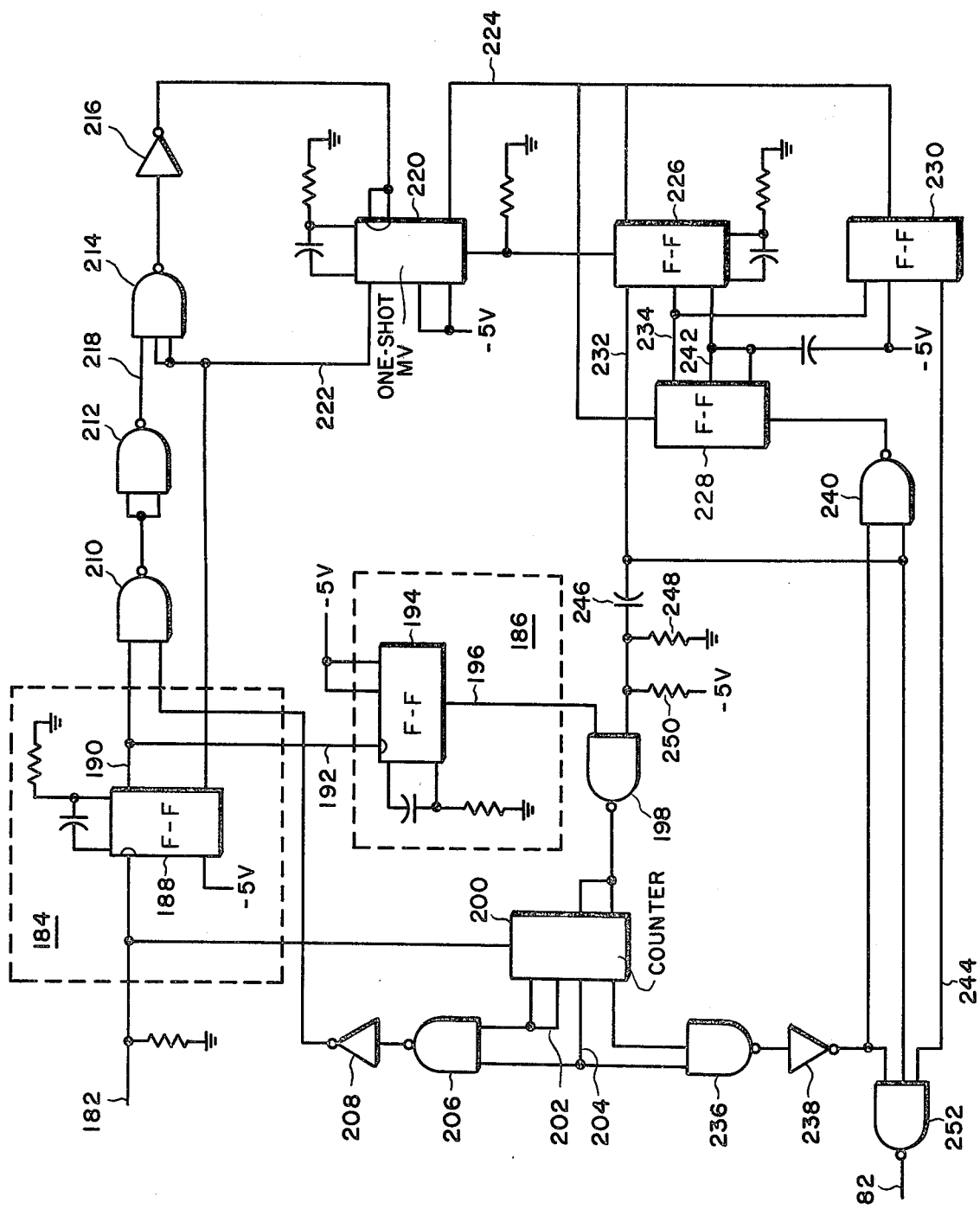
FIG. 5 is a detailed block diagram of a preferred embodiment of an Error Density Counter.

A criterion for error density is that the number of errors exceed 3 during a 10-second interval. This prevents operation of the alarm and transfer circuitry on the receipt of occasional fortuitous errors in the data stream. When errors occur in the data stream, they are detected as explained in U.S. Pat. No. 3,337,864. The error pulses generated in the error detector have a duration of 100 microseconds and are positive going. The error pulses are applied to input path 182 of the Error Density Detector shown in FIG. 5. When the first error pulse appears on input path 182, the timing cycle is started for both the 10-second "GAP" timer 184 and the 50-millisecond "BURST" timer 186. The positive error pulse triggers flip-flip 188. This starts the 10-second interval and causes the 188 output on path 190 to become a binary "1". This in turn triggers BURST timer flip-flop 194 via 192 which causes the output 196 to become binary "0". This forces the output of NAND-gate 198 to binary "1" which holds the four-stage counter 200 reset. Thus, "BURST" timer prevents error counting during a 50 millisecond interval. This is necessary to prevent false operation during transfer, either manual or automatic. Once the "BURST" timer has timed out, binary "0" input to NAND-gate 198 is removed and any further errors that occur before the "GAP" timer times out are counted. If three errors are counted in this interval, the output at 202 and 204 of counter 200 both become binary "1". Thus, the output of NAND-gate 206 becomes binary "0", which is inverted in inverter 208 and a binary "1" is applied to one input of NAND-gate 210. If the "GAP" timer has not timed out, a binary "1" is applied on the other input of gate 210 from path 190 which causes a binary "0" output. NAND-gate 212 inverts the input and applies a binary "1" over path 218 to one input of NAND-gate 214. The $\overline{Q}$ output of one-shot multivibrator 220 is binary "1" and is applied to the other input of NAND-gate 214 and to the clear input of 188. With a 1 1 input, NAND-gate 214 has a binary "0" output, which is inverted in inverter 216. This applies a binary "1" to one-shot multivibrator 220 causing it to change state. The change lasts for a period of about 7 seconds. During this period, NAND-gate 214 is effectively disabled and flip-flop 188 is reset so as to be ready for immediate operation after the one-shot multivibrator 220 times out. The "1" output on path 224 triggers flip-flop 226 into a nominal 1 second period and releases flip-flops 228 and 230 for operation. When 226 turns on, the output Q on path 232 is binary "1" and the output $\overline{Q}$ on path 234 is binary "0". Errors are again counted for a 1-second interval. If a count of 15 is obtained by count of counter 200, NAND-gate 236 has a binary "0" output which is inverted in 238 and is applied as one input of NAND-gate 240. Since the Q output of 226 is binary "1", NAND-gate 240 has 1 1 inputs so the binary "0" output presets flip-flop 228, and the $\overline{Q}$ output of 228 becomes binary "1" when 226 times out. Also, the $\overline{Q}$ output of 226 goes high on time out which clocks 228 and 230. When this occurs, the $\overline{Q}$ output of 230 will becomes binary "1" on path 244. Flip-flop 228 will toggle so that the $\overline{Q}$ output on path 242 goes to binary "0". At the same time, flip-flop 226 Q output goes to binary "0", is differentiated by capacitor 246, resistors 248 and 250, and this causes the output of NAND-gate 198 to become binary "1", which resets counter 200. The Q output on path 224 from one-shot multivibrator 220 is still binary "1" and this is continuously applied to flip-flop 226. The negative going transition of $\overline{Q}$ output of flip-flop 228 will trigger 226 into another timing sequence. At this time the Q output of 230 along path 224 is binary "1", the $\overline{Q}$ output of 226 is also high. If another error count of 15 is received, NAND-gate 236 will have 1 1 1 inputs and its binary "0" output will be inverted in 238 and applied as one input to NAND-gate 252. All inputs to gate 252 are now 1 and the output is binary "0", which is applied to the alarm circuitry in Remote Alarm and Main Control 98.

What is claimed is:

1. In a common channel signaling system wherein a predetermined number of equal interval time-divided spaces comprise a frame which includes; a space for a system framing signal, a plurality of spaces for transmission of signaling information, and a space for carrying one of a plurality of status signals, $n$, during each frame, apparatus for time sequencing said status signals for transmission of one status signal each frame, which comprises:

means for deriving said predetermined number of equal interval time-divided spaces, including the status space and for deriving the system frame synchronization signal for each frame;

submultiplexing means operatively connected to said deriving means and arranged to accept $n-1$ status signals for time multiplexing, said submultiplexing means including means for creating a submultiplexer frame status signal and combining means operatively connected to said system frame synchronizing signal and said submultiplexer frame status signal; said combining means generating a synchronizing signal for transmission every $n^{th}$ frame when both the system frame synchronizing signal and the submultiplexer frame status signal are recurrent; and generating a loss of synchronization signal for transmission when either said frame synchronization signal or said submultiplexer frame status signal is not recurrent.

2. Apparatus in accordance with claim 1 wherein said combining means generates a submultiplexer synchronizing signal which is alternately binary 1 and binary 0 every $n^{th}$ frame.

3. Apparatus in accordance with claim 2 wherein said combining means generates an alternating submultiplex synchronizing signal which is binary 1 only when said frame synchronizing signal is binary 0.

4. Deriving means in accordance with claim 3 wherein said predetermined number is 26, further comprising:

means for storing the 24 information signals, frame synchronization signal, and the status signal to be encoded for each frame;

clock means having a pulse repetition rate of 2400 pulses per second;

a five-bit binary counter having an input connected to said clock means, a plurality of outputs connected to said storage means to provide timing information for encoding said stored signals; and, a flip-flop having its clock pulse input connected to one output of said five-bit binary counter and having its output connected to said storage means, said flip-flop output providing the alternating binary 1, binary 0 frame synchronization signal.

5. Apparatus in accordance with claim 1 wherein said deriving means further includes a 26-state binary counter which comprises:

a binary timing signal;

a first inverting means having an input connected to receive said timing signal and an output;

a second inverting means having an output and an input connected to the output of said first inverting means;

means for dividing the timing signal by 2, having an input operatively connected to the output of said second inverting means and having an output;

means for dividing by 16, having an input connected to the output of said divide-by-two means and having a pair of outputs which are selected to have a like state when a count of 25 is attained;

first gating means having a pair of inputs connected to the selected pair of outputs of said divide-by-16 means and having an output, said gating means having an output when the inputs are of one like state;

second gating means having three inputs, one said input being connected to the output of said first gating means, a second said input being connected to the output of said divide-by-2 means; and the third said input being connected to the output of said first inverting means and having an output when the three inputs are in one like state;

a flip-flop having a reset input connected to the output of the second gating means and having an output;
a third gating means having one input connected to the output of said flip-flop and a second input connected to the output of said second inverting means, said third gating means providing a reset pulse to said first and second dividing means when the timing signal operates to increases the count above 25.

* * * * *